US012741271B2

(12) United States Patent
Asakoshi et al.

(10) Patent No.: US 12,741,271 B2
(45) Date of Patent: Sep. 22, 2026

(54) ELECTRICALLY HEATED EXHAUST GAS PURIFICATION CATALYST

(71) Applicant: MITSUI MINING & SMELTING CO., LTD., Tokyo (JP)

(72) Inventors: Toshiki Asakoshi, Saitama (JP); Hironori Iwakura, Saitama (JP)

(73) Assignee: Mitsui Kinzoku Company, Limited, Tokyo (JP)

( * ) Notice: Subject to any disclaimer, the term of this patent is extended or adjusted under 35 U.S.C. 154(b) by 650 days.

(21) Appl. No.: 18/026,699

(22) PCT Filed: Sep. 17, 2021

(86) PCT No.: PCT/JP2021/034282
§ 371 (c)(1),
(2) Date: Mar. 16, 2023

(87) PCT Pub. No.: WO2022/059772
PCT Pub. Date: Mar. 24, 2022

(65) Prior Publication Data
US 2023/0338929 A1 Oct. 26, 2023

(30) Foreign Application Priority Data
Sep. 18, 2020 (JP) ................................ 2020-157782

(51) Int. Cl.
*B01J 23/44* (2006.01)
*B01D 53/94* (2006.01)
(Continued)

(52) U.S. Cl.
CPC .......... *B01J 23/44* (2013.01); *B01D 53/9468* (2013.01); *B01J 21/04* (2013.01); *B01J 21/06* (2013.01);
(Continued)

(58) Field of Classification Search
CPC ... B01J 23/44; B01J 21/04; B01J 21/06; B01J 21/10; B01J 27/224; B01J 23/002;
(Continued)

(56) References Cited

U.S. PATENT DOCUMENTS 9,321,009 B2 * 4/2016 Wan ...................... B01D 53/58
2012/0076699 A1 * 3/2012 Ishihara .............. B01J 19/2485
422/174

(Continued)

FOREIGN PATENT DOCUMENTS

EP 4180120 A1 5/2023
JP 11-253815 A 9/1999

(Continued)

OTHER PUBLICATIONS

Supplementary English machine translation of JP H11253814 A (Year: 1999).*

(Continued)

*Primary Examiner* — Anthony J Zimmer
*Assistant Examiner* — Abdul-Rahman Yusuf Waleed Smari
(74) *Attorney, Agent, or Firm* — RANKIN, HILL & CLARK LLP

(57) ABSTRACT

An object of the present invention is to provide an electrically heated exhaust gas purification catalyst that is less likely to cause the deterioration of the exhaust gas purification performance, and, in order to achieve this object, the present invention provides an electrically heated exhaust gas purification catalyst (1) including: a substrate (10); at least one pair of electrodes (20*a*, 20*b*) provided on the substrate (10); an undercoat layer (30) provided on the substrate (10), the undercoat layer (30) containing an aluminum oxide as a main component; and a catalyst layer (40) provided on the undercoat layer (30), the catalyst layer (40) containing a
(Continued)

noble metal element, wherein the undercoat layer (30) contains a Group 2 element.

12 Claims, 7 Drawing Sheets

(51) Int. Cl.

| | |
|---|---|
| ***B01J 21/04*** | (2006.01) |
| ***B01J 21/06*** | (2006.01) |
| ***B01J 21/10*** | (2006.01) |
| ***B01J 27/224*** | (2006.01) |
| ***F01N 3/20*** | (2006.01) |

(52) U.S. Cl.
CPC ............. *B01J 21/10* (2013.01); *B01J 27/224* (2013.01); *F01N 3/2026* (2013.01); *B01D 2258/01* (2013.01)

(58) Field of Classification Search
CPC ........ B01J 21/066; B01J 23/005; B01J 23/02; B01J 35/57; B01J 35/615; B01J 37/0009; B01J 37/0244; B01J 37/0248; B01J 37/038; B01J 37/088; B01J 23/63; B01D 53/9468; B01D 2258/01; B01D 2255/1023; B01D 2255/407; B01D 2255/9022; B01D 53/944; F01N 3/2026; F01N 2240/16; F01N 2370/02; F01N 2510/06; F01N 3/2803; Y02T 10/12
See application file for complete search history.

(56) References Cited

U.S. PATENT DOCUMENTS

| | | | |
|---|---|---|---|
| 2017/0226910 | A1 | 8/2017 | Tsurumi et al. |
| 2020/0063628 | A1 | 2/2020 | Shah |
| 2020/0291840 | A1 | 9/2020 | Takase |

FOREIGN PATENT DOCUMENTS

| | | | |
|---|---|---|---|
| JP | 2017-136577 | A | 8/2017 |
| JP | 2020-502429 | A | 1/2020 |
| JP | 2020-147482 | A | 9/2020 |
| WO | 2018078513 | A1 | 5/2018 |

OTHER PUBLICATIONS

International Search Report (ISR) dated Nov. 22, 2021 filed in PCT/JP2021/034282.

* cited by examiner

ELECTRICALLY HEATED EXHAUST GAS PURIFICATION CATALYST

FIELD OF THE INVENTION

The present invention relates to an electrically heated exhaust gas purification catalyst.

BACKGROUND ART

An electrically heated catalyst (hereinafter referred to as an "EHC" in some cases) is known as an exhaust gas purification catalyst provided in an exhaust gas path of an internal-combustion engine. In an EHC, application of voltage across a pair of electrodes provided on a substrate causes electric current to flow through the substrate, and causes the substrate to generate heat by virtue of Joule heat. Accordingly, an EHC makes it possible that the temperature of a catalyst layer provided on a substrate is raised before and/or immediately after the start-up of an internal-combustion engine, whereby the exhaust gas purification performance can be sufficiently exerted immediately after the start-up of the internal-combustion engine.

For example, silicon carbide (SiC) is used as a material constituting a substrate in an EHC (for example, Patent Literature 1).

CITATION LIST

Patent Literature

Patent Literature 1: JP2017-136577A

SUMMARY OF THE INVENTION

However, a conventional EHC has a problem of proneness to deterioration in terms of exhaust gas purification performance.

In view of this, an object of the present invention is to provide an electrically heated exhaust gas purification catalyst that is less prone to deterioration in terms of exhaust gas purification performance.

The present inventors have discovered that, when a conventional EHC is exposed to high temperature (for example, 900° C. or more, particularly 1000° C. or more), a noble metal element contained in a catalyst layer migrates to a substrate, resulting in presenting one cause for the deterioration of the exhaust gas purification performance.

In view of this, the present inventors have vigorously studied a means of inhibiting a noble metal element contained in a catalyst layer from migrating to a substrate, and as a result, have come to complete the present invention through the discovery that providing, between the substrate and the catalyst layer, an undercoat layer containing an aluminum element as a main component and containing a Group 2 element makes it possible to inhibit the noble metal element contained in the catalyst layer from migrating to the substrate.

Thus, the present invention provides an electrically heated exhaust gas purification catalyst including: a substrate; at least one pair of electrodes provided on the substrate; an undercoat layer provided on the substrate, the undercoat layer containing an aluminum element as a main component; and a catalyst layer provided on the undercoat layer, the catalyst layer containing a noble metal element, wherein the undercoat layer contains a Group 2 element.

The present invention provides an electrically heated exhaust gas purification catalyst that is less prone to deterioration in terms of exhaust gas purification performance.

DETAILED DESCRIPTION OF THE INVENTION

Figure 1:
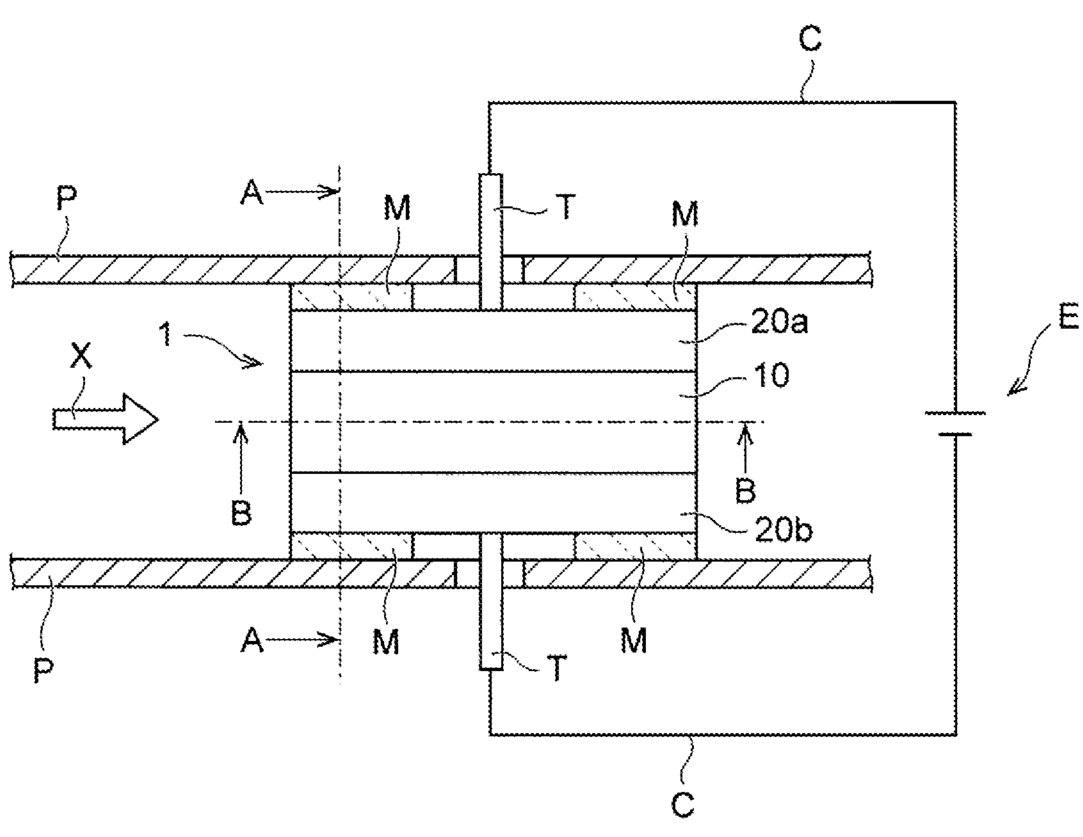
FIG. 1 is a partial cross-sectional view depicting the state where an exhaust gas purification catalyst according to one embodiment of the present invention is disposed in an exhaust pathway of an internal-combustion engine.
Figure 2:
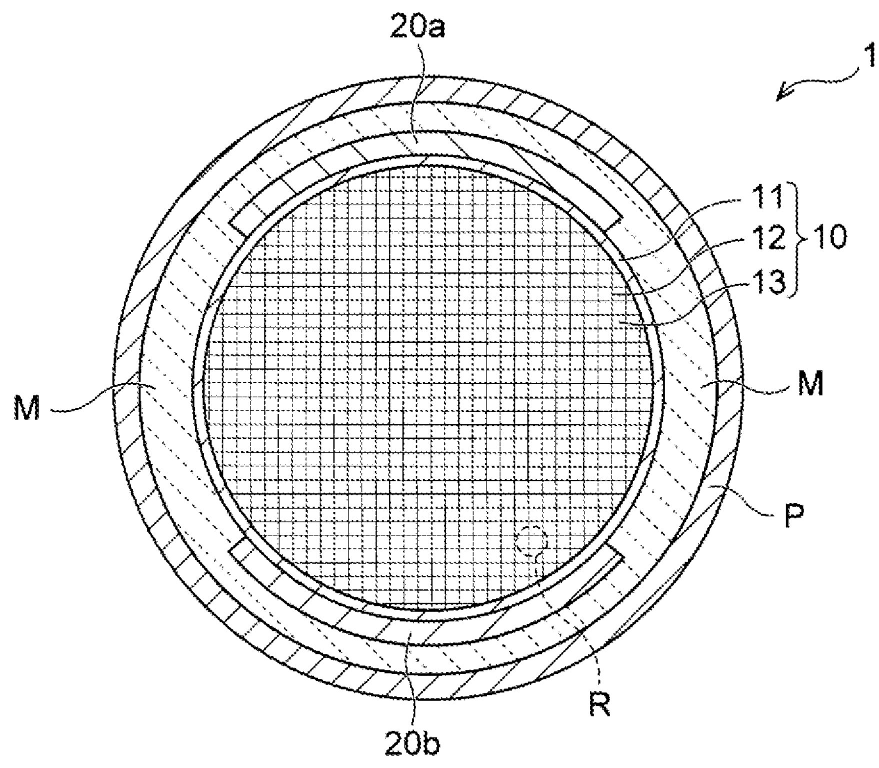
FIG. 2 is an end view taken along the line A-A in FIG. 1.
Figure 3:
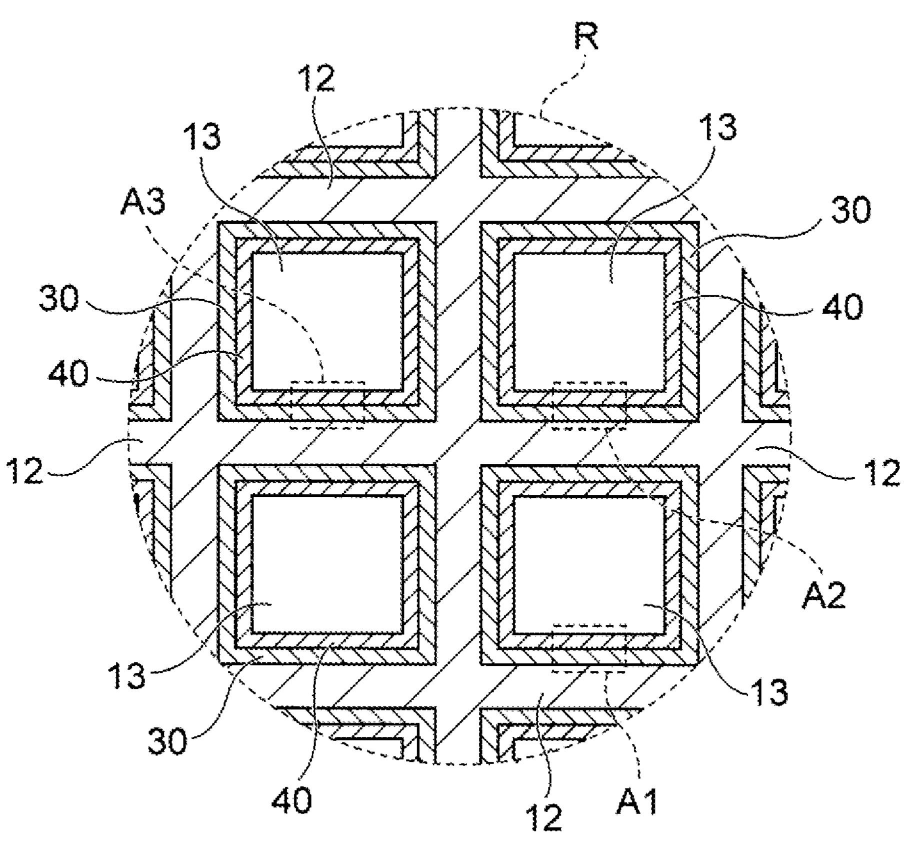
FIG. 3 is an enlarged view of the region denoted by the sign R in FIG. 2.
Figure 4:
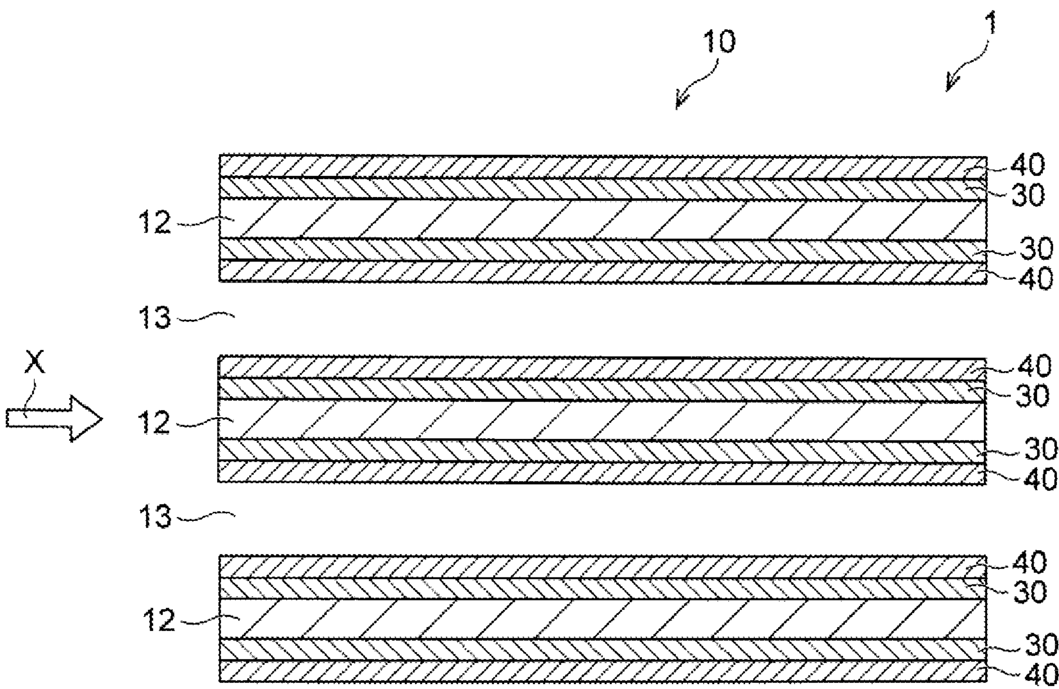
FIG. 4 is an end view taken along the line B-B in FIG. 1.

Below, an exhaust gas purification catalyst 1 according to one embodiment of the present invention will be described with reference to FIG. 1 to FIG. 4. FIG. 1 is a partial cross-sectional view depicting the state where an exhaust gas purification catalyst 1 is disposed in an exhaust pathway of an internal-combustion engine. FIG. 2 is an end view taken along the line A-A in FIG. 1. FIG. 3 is an enlarged view of the region denoted by the sign R in FIG. 2. FIG. 4 is an end view taken along the line B-B in FIG. 1.

As depicted in FIG. 1 and FIG. 2, the exhaust gas purification catalyst 1 is disposed in an exhaust gas path in an exhaust pipe P of an internal-combustion engine. Examples of internal-combustion engines include: a gasoline engine in a hybrid system (for example, a hybrid vehicle) including the gasoline engine and an electric motor; and the like. Exhaust gas emitted from the internal-combustion engine flows from one end of the exhaust pipe P toward the other end through the exhaust gas path in the exhaust pipe P, and is purified by the exhaust gas purification catalyst 1 provided in the exhaust pipe P. In the drawing, the exhaust gas flow direction is denoted by the reference sign X. In the present description, the upstream position in the exhaust gas flow direction X is referred to as the "exhaust gas in-flow side", and the downstream position in the exhaust gas flow direction X is referred to as the "exhaust gas out-flow side", in some cases.

Together with the exhaust gas purification catalyst 1, another exhaust gas purification catalyst may be disposed in the exhaust gas path in the exhaust pipe P. For example, it is possible that the exhaust gas purification catalyst 1 is disposed upstream in the exhaust gas path in the exhaust pipe P, and that another exhaust gas purification catalyst is disposed downstream in the exhaust gas path in the exhaust pipe P. The another exhaust gas purification catalyst is optionally an electrically heated catalyst, or is optionally not an electrically heated catalyst. Examples of other such exhaust gas purification catalysts include: the below-mentioned variation 1' of the exhaust gas purification catalyst 1; and the like.

As depicted in FIG. 1 and FIG. 2, an annular insulating member M that insulates the exhaust gas purification catalyst 1 from the exhaust pipe P is provided between the exhaust gas purification catalyst 1 and the exhaust pipe P. Examples of a material constituting the insulating member include: inorganic materials having low electrical conductivity (for example, alumina); and the like.

As depicted in FIG. 1 to FIG. 4, the exhaust gas purification catalyst 1 includes: a substrate 10; a pair of electrodes 20*a* and 20*b* provided on the substrate 10; an undercoat layer 30 provided on the substrate 10; and a catalyst layer 40 provided on the undercoat layer 30. The pair of electrodes 20*a* and 20*b* and the undercoat layer 30 are all provided on the substrate 10. However, in the substrate 10, the portion where the pair of electrodes 20*a* and 20*b* are provided and the portion where the undercoat layer 30 is provided are different. In the present embodiment, as mentioned below, the pair of electrodes 20*a* and 20*b* are provided around the outer periphery of the tubular member 11 of the substrate 10, and the undercoat layer 30 is provided on the partition wall 12 of the substrate 10.

The exhaust gas purification catalyst 1 is an electrically heated exhaust gas purification catalyst. Specifically, as depicted in FIG. 1, a power supply E is electrically connected to the pair of electrodes 20*a* and 20*b* via electrode terminals T, cable C, and the like. When the power supply E applies voltage across the pair of electrodes 20*a* and 20*b*, electric current is caused to flow through the substrate 10, thus causing the substrate 10 to generate heat by virtue of Joule heat. Accordingly, the exhaust gas purification catalyst 1 makes it possible that the temperature of the catalyst layer 40 provided on the substrate 10 is raised before and/or immediately after the start-up of the internal-combustion engine, whereby the exhaust gas purification performance can be sufficiently exerted immediately after the start-up of the internal-combustion engine.

The voltage to be applied across the pair of electrodes 20*a* and 20*b* can be suitably adjusted depending on the electrical resistivity of the substrate 10. The electrical resistivity of the substrate 10 is, for example, 0.001 Ω·cm or more and 10000 Ω·cm or less.

As depicted in FIG. 2 to FIG. 4, the substrate 10 includes: a tubular member 11 that defines the external shape of the substrate 10; a partition wall 12 provided in the tubular member 11; and cells 13 separated from each other by the partition wall 12. The substrate 10 has, for example, a honeycomb structure.

As depicted in FIG. 2, the tubular member 11 has a hollow cylindrical shape, and may have another shape, for example, an elliptic cylindrical shape or a polygonal tubular shape.

As depicted in FIG. 2 to FIG. 4, the partition wall 12 exists between the adjacent cells 13, and the adjacent cells 13 are separated from each other by the partition wall 12. The partition wall 12 is preferably porous. The thickness of the partition wall 12 can be adjusted as appropriate, and is, for example, 40 μm or more and 350 μm or less.

As depicted in FIG. 4, the cells 13 each extend in the exhaust gas flow direction X, and each have an end at the exhaust gas in-flow side and an end at the exhaust gas out-flow side.

As depicted in FIG. 4, both of the exhaust gas in-flow side end and the exhaust gas out-flow side end of the cell 13 are open. Accordingly, the exhaust gas that has flowed in through the exhaust gas in-flow side end (opening) of the cell 13 flows out through the exhaust gas out-flow side end (opening) of the cell 13. Such a manner is called a flow-through type.

As depicted in FIG. 2 and FIG. 3, the planar-view shape of the exhaust gas in-flow side end (opening) of the cell 13 is quadrangle, and may be otherwise, for example, hexagonal or octagonal. The same thing applies to the planar-view shape of the exhaust gas out-flow side end (opening) of the cell 13.

Accordingly, the density of the cells per square inch of the substrate 10 is, for example, 150 cells or more and 1500 cells or less. The density of the cells per square inch of the substrate 10 is the total number of the cells 13 per square inch of the cross-section obtained by cutting the substrate 10 along the plane perpendicular to the exhaust gas flow direction X.

The substrate 10 can be selected suitably from substrates to be used commonly for electrically heated exhaust gas purification catalysts. Examples of such substrates include metal substrates, electroconductive ceramic substrates, and the like. A metal constituting a metal substrate may be a simple-component metal or an alloy.

The substrate 10 is preferably an electroconductive ceramic substrate in light of achieving larger heat-generation and smaller expansion.

The electroconductive ceramic substrate preferably contains a silicon-element-containing inorganic conductor as a main component in light of achieving larger heat-generation and smaller expansion. The amount of the silicon-element-containing inorganic conductor (in the cases where two or more types of silicon-element-containing inorganic conductors are contained as main components, the total amount of the two or more types of silicon-element-containing inorganic conductors) is preferably 50 mass % or more, more preferably 60 mass % or more, still more preferably 70 mass % or more, based on the mass of the electroconductive ceramic substrate. The upper limit value is theoretically 100 mass %, but in reality, can be less than 100 mass % (for example, 99 mass % or less), considering the presence of unavoidable impurities. Such unavoidable impurities are, for example, trace elements that unavoidably leak in during the production of the substrate.

Examples of silicon-element-containing inorganic conductors include metal silicon, silicon carbide, silicide, and the like. Examples of silicides include tantalum silicide, chromium silicide, iron silicide, titanium silicide, molybdenum silicide, tungsten silicide, and the like.

The electroconductive ceramic substrate preferably contains silicon carbide as a main component or silicon carbide and metal silicon as main components in light of achieving larger heat-generation and smaller expansion. In the cases where silicon carbide and metal silicon are contained as main components, the amount of the metal silicon is preferably 10 mass % or more and 40 mass % or less, more preferably 12.5 mass % or more and 35 mass % or less, still more preferably 15 mass % or more and 30 mass % or less, based on the total mass of the silicon carbide and the metal silicon.

The electroconductive ceramic substrate may contain one or more types of components (for example, insulating ceramic materials) other than the silicon-element-containing inorganic conductor. Examples of components other than the silicon-element-containing inorganic conductor include alumina, zirconia, mullite, zircon, cordierite, aluminum titanate, silicon nitride, boron nitride, various borosilicate salts, and the like.

The electroconductive ceramic substrate containing a silicon-element-containing inorganic conductor as a main component can be produced in accordance with a conventional method. An electroconductive ceramic substrate of interest can be produced, for example, by mixing a powder of a silicon-element-containing inorganic conductor (for example, a silicon carbide powder, a metal silicon powder, or the like) and (an)other component(s) (for example, a binder, a surfactant, a pore-forming material, water, and/or the like) to prepare a molding material, molding the resulting material, drying the molded material, and calcining the resulting material.

As depicted in FIG. 1 and FIG. 2, the pair of electrodes 20*a* and 20*b* are provided on the outer periphery of the tubular member 11 of the substrate 10 so as to be opposed to, and also not in contact with, each other with the central axis of the substrate 10 therebetween.

The electrodes 20*a* and 20*b* are each, for example, in the shape of a layer. The electrodes 20*a* and 20*b* preferably each extend in the exhaust gas flow direction X from the exhaust gas in-flow side end of the tubular member 11 of the substrate 10 or from the vicinity of the end up to the exhaust gas out-flow side end of the tubular member 11 of the substrate 10 or up to the vicinity of the end in light of inhibiting unevenness in the electric current that flows through the substrate 10 (in turn, unevenness in the temperature distribution of the substrate 10).

A material constituting the electrodes 20*a* and 20*b* can be selected suitably from materials that are commonly used. Examples of such materials include metals, electroconductive ceramics, and the like. The metal may be a simple-component metal or an alloy. The electroconductive ceramic material is as described earlier.

At least one pair of electrodes have only to be provided on the substrate 10. Accordingly, two or more pairs of electrodes may be provided on the outer periphery of the tubular member 11 of the substrate 10. For example, a pair of electrodes for generating heat from the exhaust gas in-flow side portion of the substrate 10 and a pair of electrodes for generating heat from the exhaust gas out-flow side portion of the substrate 10 may be provided separately on the substrate 10.

As depicted in FIG. 4, the undercoat layer 30 is provided on the partition wall 12 of the substrate 10.

As depicted in FIG. 4, the undercoat layer 30 extends in the exhaust gas flow direction X from the exhaust gas in-flow side end of the partition wall 12 up to the exhaust gas out-flow side end of the partition wall 12. The undercoat layer 30 may extend in the exhaust gas flow direction X from the exhaust gas in-flow side end of the partition wall 12 but not up to the exhaust gas out-flow side end of the partition wall 12, or may extend in the direction opposite to the exhaust gas flow direction X from the exhaust gas out-flow side end of the partition wall 12 but not up to the exhaust gas in-flow side end of the partition wall 12.

The undercoat layer 30 contains an aluminum element as a main component, and contains one or more types of Group 2 elements. The Group 2 element is an element belonging to Group 2 of the periodic table.

When a conventional EHC is exposed to high temperature (for example, 900° C. or more, particularly 1000° C. or more), a noble metal element contained in a catalyst layer migrates to a substrate, resulting in presenting one cause for the deterioration of the exhaust gas purification performance. In the cases where the substrate is an electroconductive ceramic substrate containing a silicon-element-containing inorganic conductor as a main component, a noble metal element contained in a catalyst layer is prone to migrate to the substrate. The present inventors have confirmed that, in the cases where an electroconductive ceramic substrate containing a silicon-element-containing inorganic conductor as a main component (for example, an electroconductive ceramic substrate containing silicon carbide as a main component, or an electroconductive ceramic substrate containing silicon carbide and metal silicon as main components) is used, a noble metal element contained in a catalyst layer is prone to migrate to the substrate, and the silicon element contained in the substrate is prone to migrate to the catalyst layer, and that, in the cases where a cordierite-made substrate is used, a noble metal element contained in a catalyst layer is not prone to migrate to the substrate, and the silicon element contained in the substrate is not prone to migrate to the catalyst layer. From these facts, it is considered that, in the cases where an electroconductive ceramic substrate containing a silicon-element-containing inorganic conductor as a main component is used, the silicon element contained in the substrate migrates to a catalyst layer, and a noble metal element contained in the catalyst layer migrates to the substrate along the silicon element that has migrated to the catalyst layer.

In contrast, the presence of the undercoat layer 30 between the partition wall 12 of the substrate 10 and the catalyst layer 40 makes it possible to inhibit the noble metal element contained in the catalyst layer 40 from migrating to the substrate 10, and makes it possible to inhibit the deterioration of the exhaust gas purification performance. Such an effect is exerted in the cases where an undercoat layer containing an aluminum element as a main component and containing no Group 2 element exists between the partition wall 12 of the substrate 10 and the catalyst layer 40. Such an effect is exerted more effectively in the cases where the undercoat layer 30 containing an aluminum element as a main component and containing a Group 2 element exists between the partition wall 12 of the substrate 10 and the catalyst layer 40.

This effect of the undercoat layer 30 is particularly outstanding in the cases where the substrate 10 is an electroconductive ceramic substrate containing a silicon-element-containing inorganic conductor as a main component. It is considered that, in the cases where the substrate 10 is an electroconductive ceramic substrate containing a silicon-element-containing inorganic conductor as a main component, the effect of the undercoat layer 30 is achieved by virtue of the following mechanism. It is considered that in order to migrate to the catalyst layer 40, the silicon element contained in the substrate 10 needs to pass through the undercoat layer 30, and that when passing through the undercoat layer 30, the silicon element contained in the substrate 10 chemically reacts with the Group 2 element to be thereby trapped in the undercoat layer 30, and is inhibited from migrating to the catalyst layer 40. Accordingly, this conceivably results in inhibiting the noble metal element contained in the catalyst layer 40 from migrating to the substrate 10 along the silicon element that would migrate to the catalyst layer 40.

The above-mentioned effect of the undercoat layer 30 increases or decreases as the mass of the undercoat layer 30 per unit volume of the substrate 10 increases or decreases. This is because the increase or decrease in the mass of the undercoat layer 30 per unit volume of the substrate 10 increases or decreases the physical barrier effect of the undercoat layer 30. In addition, the effect of the undercoat layer 30 increases or decreases as the amount of the Group 2 element contained in the undercoat layer 30 increases or decreases. This is because the increase or decrease in the amount of the Group 2 element contained in the undercoat layer 30 increases or decreases the amount of the chemical reaction between the Group 2 element and the silicon element (the amount of the silicon element trapped by the reaction with the Group 2 element). The contribution of the undercoat layer 30 to the increase or decrease in the above-mentioned effect depends more on the increase or decrease in the amount of the Group 2 element contained in the undercoat layer 30 than on the increase or decrease in the mass of the undercoat layer 30 per unit volume of the substrate 10. Accordingly, even if the mass of the undercoat layer 30 per unit volume of the substrate 10 is decreased, increasing the amount of the Group 2 element contained in the undercoat layer 30 will make it possible to maintain the effect of the undercoat layer 30. Thus, increasing the amount of the Group 2 element contained in the undercoat layer 30 and decreasing the mass of the undercoat layer 30 per unit volume of the substrate 10 makes it possible to maintain the effect of the undercoat layer 30 and, at the same time, to raise the temperature of the catalyst layer 40 earlier. This is because the decrease in the mass of the undercoat layer 30 per unit volume of the substrate 10 decreases the heat capacity of the whole exhaust gas purification catalyst 1, making it possible to raise the temperature of the catalyst layer 40 earlier, and also because the increase induced in the effect of the undercoat layer 30 by the increase in the amount of the Group 2 element contained in the undercoat layer 30 makes it possible to compensate for the decrease induced in the effect of the undercoat layer 30 by the decrease in the mass of the undercoat layer 30 per unit volume of the substrate 10, whereby the effect of the undercoat layer 30 can be maintained.

In light of exerting the effect of the undercoat layer 30 more effectively, the amount of the aluminum element contained in the undercoat layer 30 is preferably 50 mol % or more, more preferably 55 mol % or more, still more preferably 60 mol % or more, based on the total molar amount of all the metal elements contained in the undercoat layer 30. The upper limit is a value given by subtracting, from 100 mol %, the mol % value of the Group 2 element contained in the undercoat layer 30, and is, for example, 99 mol %, 97 mol %, or 95 mol %.

In the cases where the composition of the raw materials used to form the undercoat layer 30 is known, the amount of the aluminum element contained in the undercoat layer 30 can be calculated from the composition of the raw materials used to form the undercoat layer 30.

Alternatively, the amount of the aluminum element contained in the undercoat layer 30 can be measured using a conventional method such as scanning electron microscopy-energy dispersive X-ray spectroscopy (SEM-EDX), X-ray fluorescence analysis (XRF), inductively coupled plasma-atomic emission spectroscopy (ICP-AES), or the like. A specific example is as mentioned below.

First, a test piece cut out of the exhaust gas purification catalyst 1 is pulverized and then analyzed by XRF or ICP-AES so that among metal elements large in content, top 20 metal elements can be identified. One of the 20 metal elements identified is an aluminum element. The test piece may contain a portion derived from the substrate 10 and/or a portion derived from the catalyst layer 40 as long as the test piece contains a portion derived from the undercoat layer 30. In the cases where the test piece contains a portion derived from the substrate 10 and/or a portion derived from the catalyst layer 40, the 20 metal elements identified may contain a metal element constituting the substrate 10 and/or a metal element constituting the catalyst layer.

Then, the undercoat layer 30 is analyzed by SEM-EDX. In SEM-EDX, the 20 metal elements identified as mentioned above are used as analysis objects, and from each of 10 fields of view in SEM, the mol % value of each metal element is analyzed, assuming that the total mol % value of the 20 metal elements is 100 mol %. The average of the mol % values of the aluminum elements in the 10 fields of view is regarded as the amount of the aluminum element contained in the undercoat layer 30.

The amount of another metal element (for example, a Group 2 element, a cerium element, a zirconium element, a noble metal element, or the like) contained in the undercoat layer 30 can be calculated or measured in the same manner as the amount of the aluminum element contained in the undercoat layer 30.

In light of exerting the effect of the undercoat layer 30 more effectively, the Group 2 element contained in the undercoat layer 30 is preferably selected from magnesium (Mg), calcium (Ca), strontium (Sr), and barium (Ba) elements, and is more preferably a magnesium element.

In light of exerting the effect of the undercoat layer 30 more effectively, the amount of the Group 2 element contained in the undercoat layer 30 (in the cases where the undercoat layer 30 contains two or more types of Group 2 elements, the total amount of the two or more types of Group 2 elements) is preferably 1 mol % or more and 40 mol % or less, more preferably 3 mol % or more and 35 mol % or less, still more preferably 5 mol % or more and 30 mol % or less, based on the total molar amount of all the metal elements contained in the undercoat layer 30.

In light of exerting the effect of the undercoat layer 30 more effectively, the total amount of the aluminum element and the Group 2 element contained in the undercoat layer 30 is preferably 85 mol % or more and 100 mol % or less, more preferably 90 mol % or more and 100 mol % or less, still more preferably 95 mol % or more and 100 mol % or less, still more preferably 97 mol % or more and 100 mol % or less, based on the total molar amount of all the metal elements contained in the undercoat layer 30.

A part or all of the aluminum elements contained in the undercoat layer 30 may form an aluminum oxide (alumina), or may form a composite with a part or all of the Group 2 elements contained in the undercoat layer 30. In addition, it is also possible that a part of the aluminum elements contained in the undercoat layer 30 form an alumina, and the rest of the aluminum elements contained in the undercoat layer 30 form a composite with a part or all of the Group 2 elements contained in the undercoat layer 30. An alumina can form a single phase (alumina phase) that is a crystal phase or an amorphous phase. Examples of alumina phases include an a alumina phase, alumina phases other than an a alumina phase (for example, a γ alumina phase, a θ alumina phase, and the like), and the like.

A part or all of the Group 2 elements contained in the undercoat layer 30 may form an oxide (for example, magnesium oxide, calcium oxide, strontium oxide, barium oxide, or the like), or may form a composite with a part or all of the aluminum elements contained in the undercoat layer 30. In addition, it is also possible that a part of the Group 2 elements contained in the undercoat layer 30 form an oxide, and the rest of the Group 2 elements contained in the undercoat layer 30 form a composite with a part or all of the aluminum elements contained in the undercoat layer 30. An oxide of a Group 2 element can form a single phase (an oxide phase of a Group 2 element) that is a crystal phase or an amorphous phase.

A compound formed as a composite from an aluminum element and a Group 2 element is preferably a composite oxide containing an aluminum element and a Group 2 element. Examples of composite oxides containing an aluminum element and a Group 2 element include: oxides obtained by modifying the surface of an alumina with a Group 2 element; oxides obtained by solid solution of a Group 2 element in an alumina; and the like.

The composite oxide containing an aluminum element and a Group 2 element may contain an element other than an aluminum element, a Group 2 element, and an oxygen element. Examples of elements other than an aluminum element, a Group 2 element, and an oxygen element include Zr, Hf, rare earth elements (for example, Y, La, Ce, Pr, Nd, and the like), and the like.

In the composite oxide containing an aluminum element and a Group 2 element, the aluminum element may form a solid solution phase with a Group 2 element and an oxygen element, or may form a single phase (for example, an alumina phase) that is a crystal phase or an amorphous phase, or may form both of the solid solution phase and the single phase. In the same manner, the Group 2 element may form a solid solution phase with an aluminum element and an oxygen element, or may form a single phase (for example, an oxide phase of a Group 2 element) that is a crystal phase or an amorphous phase, or may form both of the solid solution phase and the single phase. The formation of the solid solution phase can be verified using an X-ray diffractometer (XRD).

In the cases where a part or all of the aluminum elements contained in the undercoat layer 30 and a part or all of the Group 2 elements contained in the undercoat layer 30 form a composite, the Group 2 element is preferably a magnesium element in light of exerting the effect of the undercoat layer 30 (particularly, the effect of inhibiting Pd contained in the catalyst layer 40 from migrating to the substrate 10) more effectively.

A compound formed as a composite from an aluminum element and a Group 2 element is preferably a composite oxide containing an aluminum element and a Group 2 element. The composite oxide containing an aluminum element and a Group 2 element has a spinel type crystal structure. That is, the composite oxide containing an aluminum element and a Group 2 element contains a crystal phase having a spinel type crystal structure (hereinafter referred to as a "spinel type crystal phase"). A spinel type crystal structure is a crystal structure of the cubic crystal system and belongs to the space group Fd-3m.

The composite oxide containing an aluminum element and a Group 2 element may be constituted by a single phase of a spinel type crystal phase, or may be constituted by a phase mixture containing a spinel type crystal phase and one or more types of other phases, and is preferably constituted by a single phase of a spinel type crystal phase. The other phases may each be a crystal phase or an amorphous phase. Examples of the above-mentioned other phases include an oxide phase of a Group 2 element (for example, a MgO phase), a alumina phase, alumina phases other than an a alumina phase (for example, a $\gamma$ alumina phase, a $\theta$ alumina phase, and the like), a hydrotalcite phase, and the like.

In the cases where the composite oxide containing an aluminum element and a Group 2 element is constituted by a phase mixture, a first phase is preferably a spinel type crystal phase. Alternatively, in the cases where a first phase is an a alumina phase, a second phase is preferably a spinel type crystal phase. The "first phase" means a crystal phase from which a peak having a maximum intensity (a main peak) is derived in a diffraction pattern given by powder X-ray diffractometry (XRD) using CuKα. The "second phase" means a crystal phase from which a peak having a maximum intensity, chosen from among peaks other than the peak derived from the first phase, is derived.

The fact that the composite oxide containing an aluminum element and a Group 2 element contains a spinel type crystal phase can be verified by XRD using CuKα. XRD can be performed using a commercially available X-ray diffractometer (for example, a MiniFlex600 manufactured by Rigaku Corporation). XRD can be performed, for example, under the following conditions: the X-ray source, CuKα; the operation axis, 2θ/θ; the measurement method, consecutive; the counting unit, cps; the start angle, 5°; the end angle, 85°; the sampling width, 0.02°; the scan speed, 7°/minute; the voltage, 15 kV; and the electric current, 100 mA.

In a diffraction pattern given by XRD using CuKα, a peak derived from a spinel type crystal phase is present, for example, at a position of 2θ=15° to 25° (for example, 19.0°±0.5°), 30° to 40° (for example, 37.0°±0.5°), 40° to 50° (for example, 45.0°±0.5°), 55° to 70° (for example, 65.5°±0.5°), or the like. A peak derived from a spinel type crystal phase is preferably present at a position of 2θ=37.0±0.5°.

Verifying that the composite oxide containing an aluminum element and a Group 2 element contains a spinel type crystal phase makes it possible to verify that the aluminum element and the Group 2 element have been formed into a composite.

A supply source of a Group 2 element contained in a slurry for forming an undercoat layer (for example, an acetate salt of a Group 2 element) may remain in the undercoat layer 30.

The Group 2 element is present preferably uniformly in the undercoat layer 30 in light of exerting the effect of the undercoat layer 30 more effectively. Specifically, locations of the Group 2 element and the aluminum element preferably coincide at a correlation coefficient of 50% or more, more preferably coincide at a correlation coefficient of 60% or more, still more preferably coincide at a correlation coefficient of 70% or more, still more preferably coincide at a correlation coefficient of 80% or more, wherein the correlation coefficient is obtained by performing a line analysis of the undercoat layer 30 with an electron probe microanalyser, and calculating the correlation coefficient in accordance with the following equation:

$$\text{Correlation coefficient} = \frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%)$$

wherein $x_i$ represents a characteristic X-ray intensity of the Group 2 element at location i, $x_{av}$ represents an average value of characteristic X-ray intensities of the Group 2 element, $y_i$ represents a characteristic X-ray intensity of the aluminum element at location i, and $y_{av}$ represents an average value of characteristic X-ray intensities of the aluminum element. In the cases where the locations of the Group 2 element and the aluminum element coincide at the correlation coefficient of 50% or more, it can be said that the Group 2 element is present uniformly in the undercoat layer 30.

It is preferable that the undercoat layer 30 substantially does not contain a composite oxide ($CeO_2$—$ZrO_2$-based composite oxide) containing a cerium (Ce) element and a zirconium (Zr) element. A $CeO_2$—$ZrO_2$-based composite oxide is a component that can be contained in the catalyst layer 40, and hence, does not need to be substantially contained in the undercoat layer 30. Allowing the $CeO_2$—$ZrO_2$-based composite oxide to be substantially not contained makes it possible to increase the amount of the aluminum element and/or the Group 2 element that is/are contained in the undercoat layer 30. In the cases where the undercoat layer 30 substantially does not contain a $CeO_2$—$ZrO_2$-based composite oxide, the total amount of a cerium element and a zirconium element contained in the undercoat layer 30 is preferably 5 mol % or less, more preferably 3 mol % or less, still more preferably 1 mol % or less, based on the total molar amount of all the metal elements contained in the undercoat layer 30. The lower limit is zero. The details of a $CeO_2$—$ZrO_2$-based composite oxide will be described below.

It is preferable that the undercoat layer 30 substantially does not contain a noble metal element. A noble metal element is a component that is contained in the catalyst layer 40, and hence, does not need to be substantially contained in the undercoat layer 30. Allowing a noble metal element to be substantially not contained makes it possible to increase the amount of the aluminum element and/or the Group 2 element that is/are contained in the undercoat layer 30. In the cases where the undercoat layer 30 substantially does not contain a noble metal element, the amount of the noble metal element contained in the undercoat layer 30 (in the cases where the undercoat layer 30 contains two or more types of noble metal elements, the total amount of the two or more types of noble metal elements) is preferably 3 mol % or less, more preferably 1 mol % or less, still more preferably 0.5 mol % or less, based on the total molar amount of all the metal elements contained in the undercoat layer 30. The lower limit is zero. The details of a noble metal element will be described below.

In light of exerting the effect of the undercoat layer 30 more effectively, the mass of the undercoat layer 30 per unit volume of the substrate 10 is preferably 10 g/L or more, more preferably 20 g/L or more, still more preferably 30 g/L or more. Additionally, in light of raising the temperature of the catalyst layer 40 early, the mass is preferably 80 g/L or less, more preferably 60 g/L or less, still more preferably 50 g/L or less.

As depicted in FIG. 4, the catalyst layer 40 is provided on the undercoat layer 30.

As depicted in FIG. 4, the catalyst layer 40 extends in the exhaust gas flow direction X from the exhaust gas in-flow side end of the partition wall 12 up to the exhaust gas out-flow side end of the partition wall 12. The catalyst layer 40 may extend in the exhaust gas flow direction X from the exhaust gas in-flow side end of the partition wall 12 but not up to the exhaust gas out-flow side end of the partition wall 12, or may extend in the direction opposite to the exhaust gas flow direction X from the exhaust gas out-flow side end of the partition wall 12 but not up to the exhaust gas in-flow side end of the partition wall 12.

The catalyst layer 40 contains one or more types of noble metal elements. The noble metal element can be selected, for example, from platinum (Pt), palladium (Pd), rhodium (Rh), ruthenium (Ru), iridium (Ir), osmium (Os) elements, and the like, and is preferably selected from platinum (Pt), palladium (Pd), and rhodium (Rh) elements in light of enhancing the exhaust gas purification performance. In one embodiment, the noble metal element contained in the catalyst layer 40 is a palladium element.

Such a noble metal element contained in the catalyst layer 40 is in a form capable of functioning as a catalytic active component, for example, in the form of a noble metal, an alloy containing a noble metal element, a compound containing a noble metal element (for example, an oxide of a noble metal element), or the like. The catalytic active component is preferably particulate in light of enhancing the exhaust gas purification performance.

In light of achieving a balance between the exhaust gas purification performance and the cost, the mass of the catalyst layer 40 per unit volume of the substrate 10 is preferably 40 g/L or more and 250 g/L or less, more preferably 40 g/L or more and 210 g/L or less.

In light of achieving a balance between the exhaust gas purification performance and the early raise in the temperature of the catalyst layer 40, the total mass of the undercoat layer 30 and the catalyst layer 40 per unit volume of the substrate 10 is preferably 50 g/L or more and 330 g/L or less, more preferably 50 g/L or more and 290 g/L or less, still more preferably 50 g/L or more and 250 g/L or less.

The total mass of the undercoat layer 30 and the catalyst layer 40 per unit volume of the substrate 10 can be calculated as mentioned below. The volume and mass of the exhaust gas purification catalyst 1 are measured. A substrate 10 in which neither an undercoat layer 30 nor a catalyst layer 40 is provided is made ready for use, and the mass of the substrate is measured. The mass of the substrate 10 is subtracted from the mass of the exhaust gas purification catalyst 1 to calculate the total mass of the undercoat layer 30 and the catalyst layer 40 in the exhaust gas purification catalyst 1. The total mass of the undercoat layer 30 and the catalyst layer 40 in the exhaust gas purification catalyst 1 is divided by the volume of the exhaust gas purification catalyst 1 to calculate the total mass of the undercoat layer 30 and the catalyst layer 40 per unit volume of the substrate 10.

In light of achieving a balance between the exhaust gas purification performance and the cost, the amount of the noble metal element (in the cases where the catalyst layer 40 contains two or more types of noble metal elements, the total amount of the two or more types of noble metal elements) per unit volume of the substrate 10 is preferably 0.1 g/L or more and 10 g/L or less, more preferably 0.1 g/L or more and 5 g/L or less, in terms of a noble metal.

The catalyst layer 40 contains a carrier, and the catalytic active component is preferably supported on the carrier.

The expression "the catalytic active component is supported on the carrier" means the state where the catalytic active component is physically or chemically adsorbed or retained in the external surface of the carrier or the internal surface of the pore of the carrier. For example, in the cases where a catalytic active component and a carrier exist in the same region in an element mapping analysis obtained by analyzing a cross-section of the catalyst layer using an energy dispersive spectroscope (EDS), the catalytic active component can be judged as supported on the carrier. Alternatively, measuring the particle size using a scanning electron microscope (SEM) makes it possible to verify that the catalytic active component is supported on the carrier.

The average particle size of the catalytic active component present on the surface of the carrier is preferably 10% or less, more preferably 3% or less, still more preferably 1% or less, with respect to the average particle size of the carrier. The average particle size mentioned here is an average of Feret diameters of 30 or more particles as observed by SEM.

Examples of carriers include inorganic oxide particles and the like. The inorganic oxide that constitutes inorganic oxide particles may be an inorganic oxide having oxygen storage capacity (OSC) (hereinafter referred to as an "oxygen storage component" in some cases), or may be an inorganic oxide other than an oxygen storage component.

Examples of oxygen storage components include: cerium oxide; composite oxides containing a cerium element and a zirconium element ($CeO_2$—$ZrO_2$-based composite oxide); and the like.

In such a $CeO_2$—$ZrO_2$-based composite oxide, cerium oxide and zirconium oxide preferably have the form of a solid solution phase. The cerium oxide and the zirconium oxide may each form a single phase (a cerium oxide phase and a zirconium oxide phase) in addition to the solid solution phase.

The $CeO_2$—$ZrO_2$-based composite oxide may contain one or more types of metal elements other than a cerium element and a zirconium element. The metal element or an oxide thereof, in which the metal element is other than a cerium element and a zirconium element, may have the form of a solid solution phase with cerium oxide and/or zirconium oxide, or may have the form of a single phase. Examples of metal elements other than a cerium element and a zirconium element include rare earth elements other than a cerium element, alkaline earth metals, and transition metals, and the like.

Examples of inorganic oxides other than oxygen storage components include alumina, silica, silica-alumina, alumino-silicates, alumina-zirconia, alumina-chromia, alumina-ceria, alumina-lanthana, titania, and the like.

The exhaust gas purification catalyst 1 can be produced by forming the undercoat layer 30 on the substrate 10 and then forming the catalyst layer 40 on the undercoat layer 30.

The undercoat layer 30 can be formed by mixing a supply source of an aluminum element (for example, an aluminum oxide powder), a supply source of a Group 2 element (for example, an acetate salt of a Group 2 element, an oxide of a Group 2 element, or the like), and (an)other component(s) (for example, a binder, a solvent, and/or the like) to prepare a slurry for forming an undercoat layer, coating the substrate 10 with the slurry for forming an undercoat layer, drying the resulting material, and calcining the resulting material. The supply source of a Group 2 element does not need to be a compound different from the supply source of an aluminum element, and may be the same compound as the supply source of an aluminum element. For example, a composite oxide powder containing an aluminum element and a Group 2 element can be used as the supply source of an aluminum element and the supply source of a Group 2 element. Examples of binders include metal oxide sols such as an aluminum oxide hydrate sol (for example, a boehmite sol), titanium oxide sol, cerium oxide sol, and zirconium oxide sol. An aluminum oxide sol such as an aluminum oxide hydrate sol to be used as a binder serves as a supply source of an aluminum element to be contained in the undercoat layer 30. Examples of a solvent include water, organic solvents, and the like. The drying temperature is, for example, 60° C. or more and 120° C. or less. The drying time is, for example, 0.5 hours or more and 2 hours or less. The calcining temperature is, for example, 400° C. or more and 700° C. or less. The calcining time is, for example, 0.5 hours or more and 3 hours or less. The calcining can be performed, for example, in an air atmosphere.

In light of inhibiting the silicon element contained in the substrate from migrating to the catalyst layer, the median diameter $D_{50}$ of the aluminum oxide powder and the median diameter $D_{50}$ of the composite oxide powder containing an aluminum element and a Group 2 element are each preferably 0.1 μm or more and 15 μm or less, more preferably 0.3 μm or more and 12 μm or less, still more preferably 0.5 μm or more and 10 μm or less. The median diameter $D_{50}$ of the aluminum oxide powder is a particle size at which the cumulative volume is 50% in a volume-based particle size distribution determined from the aluminum oxide powder using a laser diffraction scattering particle size distribution measurement method. The median diameter $D_{50}$ of the composite oxide powder containing an aluminum element and a Group 2 element is a particle size at which the cumulative volume is 50% in a volume-based particle size distribution determined from the composite oxide powder using a laser diffraction scattering particle size distribution measurement method.

The median diameter $D_{50}$ of the aluminum oxide powder and the median diameter $D_{50}$ of the composite oxide powder containing an aluminum element and a Group 2 element can be adjusted, for example, by pulverization with a jet mill, ball mill, bead mill, or the like, classification with a sieve having a predetermined mesh opening, or the like.

In light of inhibiting the silicon element contained in the substrate from migrating to the catalyst layer, the aluminum oxide powder and the composite oxide powder containing an aluminum element and a Group 2 element are preferably porous. The specific surface area of the aluminum oxide powder and the specific surface area of the composite oxide powder containing an aluminum element and a Group 2 element are each preferably 50 $m^2/g$ or more and 300 $m^2/g$ or less, more preferably 80 $m^2/g$ or more and 200 $m^2/g$ or less. The specific surface area is measured as per "(3.5) One point method" in "6.2 Flow method" in JIS R1626 "Measuring methods for the specific surface area of fine ceramic powders by gas adsorption using the BET method".

The catalyst layer 40 can be formed by mixing a supply source of a noble metal element (for example, a noble metal salt) and (an)other component(s) (for example, a support, a binder, a solvent, and/or the like) to prepare a slurry for forming a catalyst layer, coating the undercoat layer 30 with the slurry for forming a catalyst layer, drying the resulting material, and calcining the resulting material. Examples of binders include metal oxide sols such as a titanium oxide sol, cerium oxide sol, and zirconium oxide sol. Examples of a solvent include water, organic solvents, and the like. The drying temperature is, for example, 60° C. or more and 120° C. or less. The drying time is, for example, 0.5 hours or more and 2 hours or less. The calcining temperature is, for example, 400° C. or more and 700° C. or less. The calcining time is, for example, 0.5 hours or more and 3 hours or less. The calcining can be performed, for example, in an air atmosphere.

Figure 5:
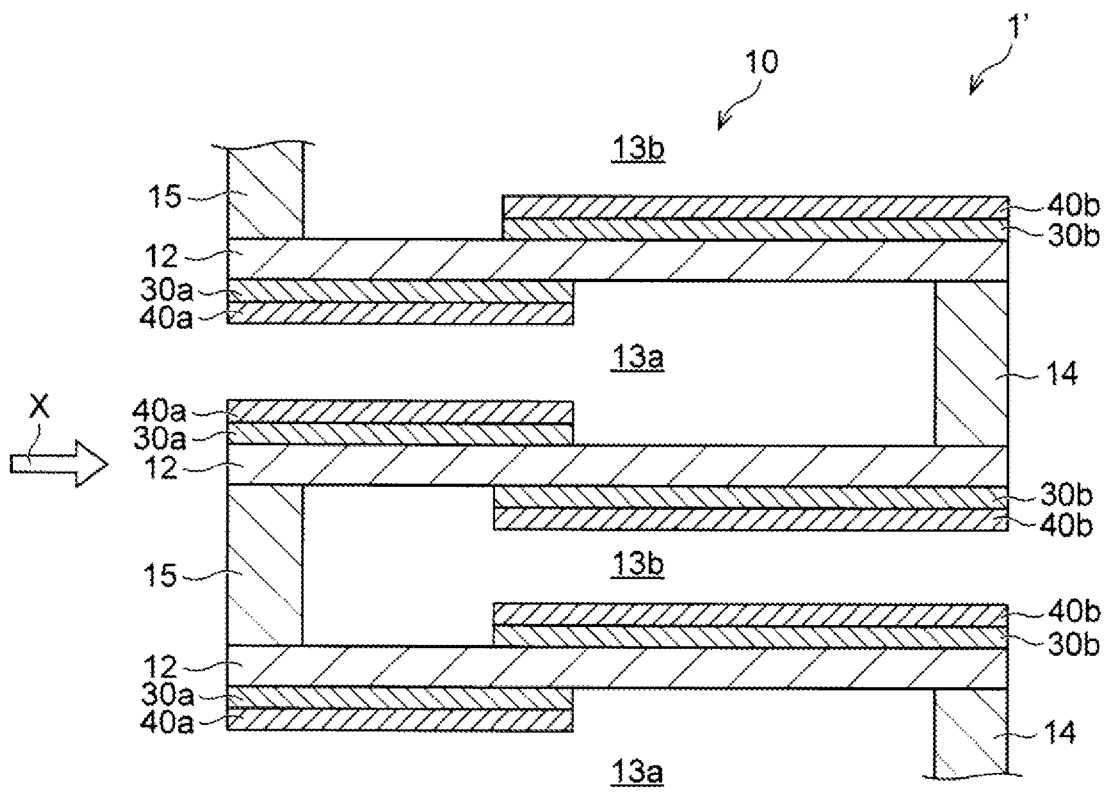
FIG. 5 is an end view (corresponding to FIG. 4) of a variation of an exhaust gas purification catalyst according to one embodiment of the present invention.

Below, a variation 1' of the exhaust gas purification catalyst 1 will be described with reference to FIG. 5. FIG. 5 is an end view (corresponding to FIG. 4) of the variation 1' of the exhaust gas purification catalyst 1. In the variation 1' of the exhaust gas purification catalyst 1, the same members as in the exhaust gas purification catalyst 1 are denoted by the same reference signs as for the exhaust gas purification catalyst 1. Unless otherwise specified below, the above description related to the exhaust gas purification catalyst 1 applies to the variation 1' of the exhaust gas purification catalyst 1.

As depicted in FIG. 5, the variation 1' of the exhaust gas purification catalyst 1 is different from the exhaust gas purification catalyst 1, in that a first sealing portion 14 that seals the exhaust gas out-flow side end of each of part of the cells 13 and a second sealing portion 15 that seals the exhaust gas in-flow side end of each of the remaining cells 13 are provided in the substrate 10, whereby an in-flow cell **13*a*, the exhaust gas in-flow side end of which is open and the exhaust gas out-flow side end of which is closed with the first sealing portion 14, and an out-flow cell 13***b*, the exhaust gas in-flow side end of which is closed with the second sealing portion 15 and the exhaust gas out-flow side end of which is open, are formed in the substrate 10, and in that the undercoat layer 30*a* is provided on the in-flow cell 13*a* side of the partition wall 12 of the substrate 10, the catalyst layer 40*a* is provided on the undercoat layer 30*a*, the undercoat layer 30*b* is provided on the out-flow cell 13*b* side of the partition wall 12 of the substrate 10, and the catalyst layer 40*b* is provided on the undercoat layer 30*b*.

As depicted in FIG. 5, a plurality of (for example, four) out-flow cells 13*b* are disposed adjacently around one in-flow cell 13*a*, and the in-flow cell 13*a* and the out-flow cells 13*b* adjacent to the in-flow cell 13*a* are separated from each other by the porous partition wall 12.

In the exhaust gas purification catalyst 1', exhaust gas that has flowed in through the exhaust gas in-flow side end (opening) of the in-flow cell 13*a* passes through the porous partition wall 12, and flows out through the exhaust gas out-flow side end (opening) of the out-flow cell 13*b*. Such a manner is called a wall-flow type.

When exhaust gas that has flowed in through the exhaust gas in-flow side end (opening) of the in-flow cell 13*a* passes through the porous partition wall 12 in the exhaust gas purification catalyst 1', particulate matter (PM) in the exhaust gas is collected in the pores of the partition wall 12. Accordingly, the exhaust gas purification catalyst 1' is useful as a gasoline particulate filter for a gasoline engine in a hybrid vehicle or a diesel particulate filter for a diesel engine in a hybrid vehicle.

As depicted in FIG. 5, the undercoat layer 30*a* and the catalyst layer 40*a* each extend in the exhaust gas flow direction X from the exhaust gas in-flow side end of the partition wall 12 but not up to the exhaust gas out-flow side end of the partition wall 12. The undercoat layer 30*a* and the catalyst layer 40*a* may each extend up to the exhaust gas out-flow side end of the partition wall 12. The undercoat layer 30*b* and the catalyst layer 40*b* each extend in the direction opposite to the exhaust gas flow direction X from the exhaust gas out-flow side end of the partition wall 12 but not up to the exhaust gas in-flow side end of the partition wall 12. The undercoat layer 30*b* and the catalyst layer 40*b* may each extend up to the exhaust gas in-flow side end of the partition wall 12.

The description related to the undercoat layer 30 above applies to the undercoat layers 30*a* and 30*b*. The composition and the like of the undercoat layer 30*a* may be the same as or different from those of the undercoat layer 30*b*.

The description related to the catalyst layer 40 above applies to the catalyst layers 40*a* and 40*b*. The composition and the like of the catalyst layer 40*a* may be the same as or different from those of the catalyst layer 40*b*.

EXAMPLES

Examples 1 to 8

Aluminum oxide (Puralox SCFa-160 manufactured by Sasol Limited) was pulverized with a ball mill to prepare an aluminum oxide powder having a median diameter $D_{50}$ of 7 to 10 μm and a BET specific surface area of 160 $m^2/g$. The median diameter $D_{50}$ of the aluminum oxide powder is a particle size at which the cumulative volume is 50% in a volume-based particle size distribution determined from the aluminum oxide powder using a laser diffraction scattering particle size distribution measurement method.

The aluminum oxide powder, an acetate salt or oxide of a Group 2 element mentioned in Table 1, a boehmite sol as a binder, and water were mixed to prepare a slurry for forming an undercoat layer. The amounts of the components of the slurry for forming an undercoat layer were adjusted in such a manner that the amounts of the aluminum element and the Group 2 element contained in the undercoat layer after calcining were the amounts mentioned in Table 1, respectively, based on the total molar amount of all the metal elements contained in the undercoat layer. The amounts of the aluminum element and the Group 2 element are amounts in terms of metal.

Palladium nitrate, lanthanum oxide-modified alumina (having a $La_2O_3$ modification amount of 5.0 mass % and a BET specific surface area of 100 $m^2/g$), a $CeO_2$—$ZrO_2$ composite oxide, and water were mixed to prepare a slurry for forming a catalyst layer. The amounts of the components of the slurry for forming a catalyst layer were adjusted in such a manner that the mass of the palladium element:the mass of the lanthanum oxide-modified alumina:the mass of the $CeO_2$—$ZrO_2$ composite oxide was 1:10:10 in the catalyst layer after calcining. The mass of the palladium element is a mass in terms of metal.

As a substrate, a Si/SiC-made honeycomb structure (having a diameter of 25.4 mm, a length of 30 mm, a cell density of 600 cells, and a partition wall thickness of 127 μm) was made ready for use. The Si/SiC-made honeycomb structure was constituted by silicon carbide and metal silicon.

The substrate was immersed in the slurry for forming an undercoat layer, and the surplus slurry in the cells was removed by airblowing. The resulting material was dried and then calcined in the air atmosphere at 450° C. for 1 hour to form an undercoat layer, the mass of which per unit volume of the substrate was 40 g/L (in Examples 1 and 4 to 8), 20 g/L (in Example 2), or 60 g/L (in Example 3).

The substrate having the undercoat layer formed thereon was immersed in the slurry for forming a catalyst layer, and the surplus slurry in the cells was removed by airblowing. The resulting material was dried and then calcined in the air atmosphere at 450° C. for 1 hour to form a catalyst layer, the mass of which per unit volume of the substrate was 95 g/L.

With the catalyst thus produced, an electron probe micro-analyser (JXA-8800R manufactured by JEOL Ltd.) was used to perform a line analysis of the undercoat layer. A correlation coefficient was calculated in accordance with the following equation:

$$\text{Correlation coefficient} = \frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%)$$

wherein $x_i$ represents a characteristic X-ray intensity of the Group 2 element at location i, $x_{av}$ represents an average value of characteristic X-ray intensities of the Group 2 element, $y_i$ represents a characteristic X-ray intensity of the aluminum element at location i, and $y_{av}$ represents an average value of characteristic X-ray intensities of the aluminum element. If the locations of the Group 2 element and the aluminum element coincide at the correlation coefficient of 50% or more, it will be deemed that the Group 2 element is present uniformly in the undercoat layer. The results are tabulated in Table 1.

Figure 6:
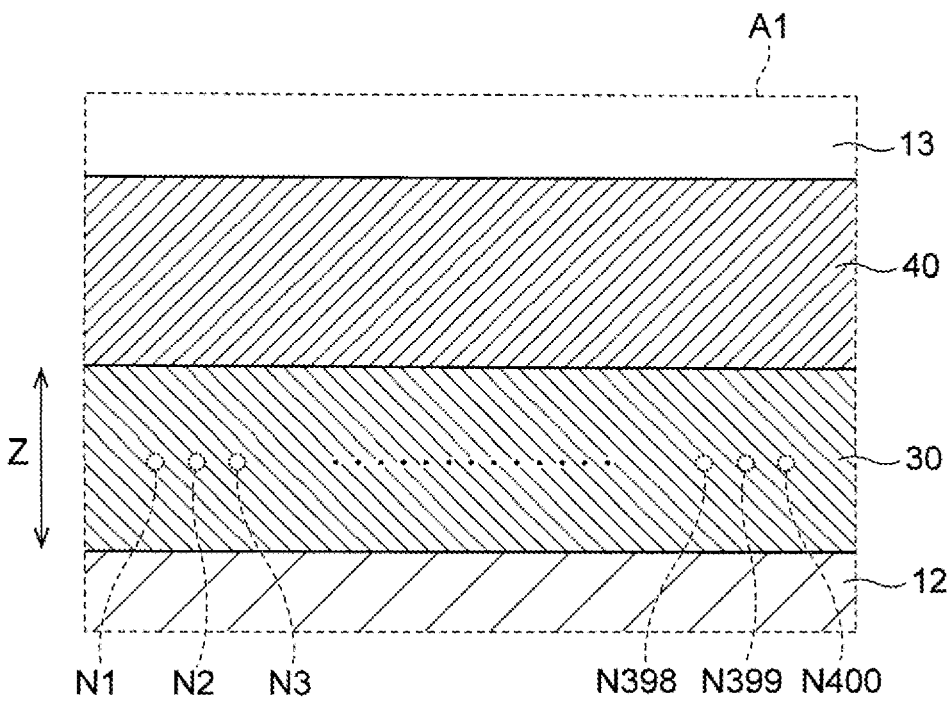
FIG. 6 is a diagram illustrating a line analysis performed on an undercoat layer in Examples and Comparative Examples.

The line analysis of the undercoat layer was performed, using an electron probe microanalyser, on the catalyst not subjected to the below-mentioned heating treatment. Specifically, as depicted in FIG. 2 and FIG. 3, the catalyst 1 produced was cut along the plane perpendicular to the axial direction of the substrate 10, and one region A1 selected freely from the cut surface was analyzed using an electron probe microanalyser (JXA-8800R manufactured by JEOL Ltd.) (at a magnification ratio of 1000× and at an acceleration voltage of 15 kV) to obtain an element mapping image. As illustrated in FIG. 6, the undercoat layer 30 was analyzed at 400 points (the measurement positions N1, N2, N3, . . . , N398, N399, and N400) at 0.5 μm intervals in the direction perpendicular to the thickness direction Z of the undercoat layer 30. The spectral intensity value of the Group 2 element of the Group 2 element particle i at each measurement location and the spectral intensity value of the aluminum element at each measurement location were measured, and the above-mentioned calculation was performed.

The catalyst produced in the same manner as mentioned above was heated at 1050° C. for 25 hours in air having a relative humidity of 10%.

Figure 7:
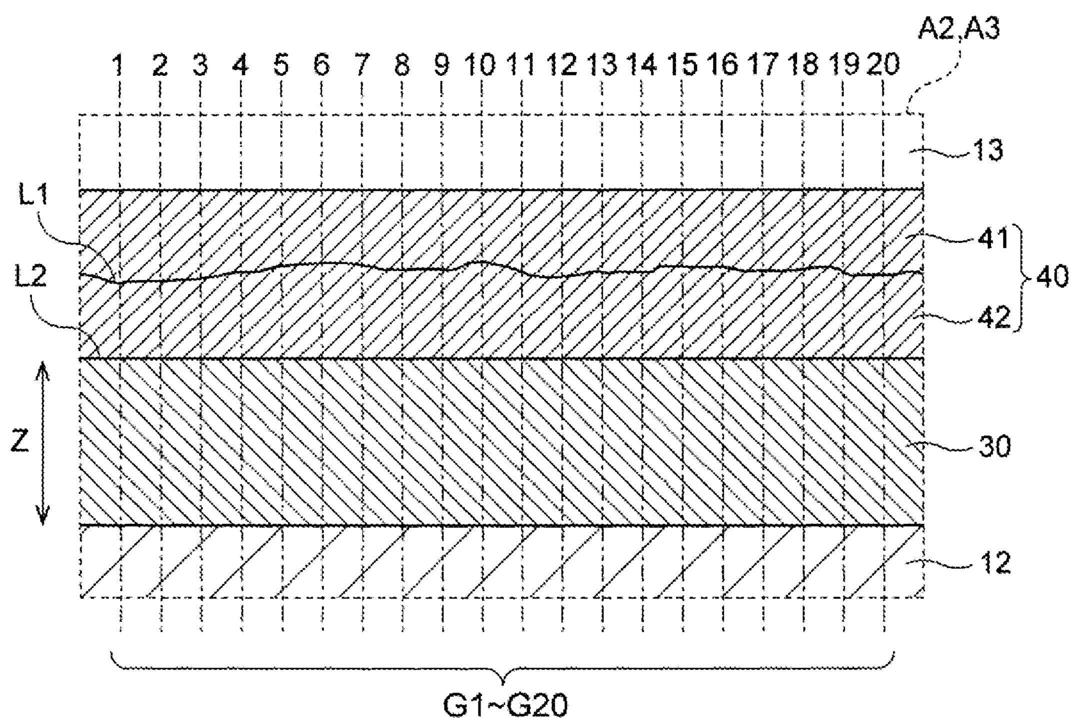
FIG. 7 is a diagram illustrating the measurement made of a migration distance of a palladium element in Examples and Comparative Examples.

The migration distance of a palladium element in the catalyst heated was measured. Specifically, as depicted in FIG. 2 and FIG. 3, the catalyst 1 heated was cut along the plane perpendicular to the axial direction of the substrate 10, and one region A2 selected freely from the cut surface was analyzed using an electron probe microanalyser (JXA-8800R manufactured by JEOL Ltd.) (at a magnification ratio of 500× and at an acceleration voltage of 15 kV) to obtain an element mapping image. Another region A3 selected freely from the cut surface was analyzed in the same manner to obtain an element mapping image. As depicted in FIG. 7, a boundary line L1 between the region 41 having a palladium element present in the catalyst layer 40 and the region 42 having no palladium element present in the catalyst layer and a boundary line L2 between the catalyst layer 40 and the undercoat layer 30 were identified in each element mapping image. As depicted in FIG. 7, 20 grid lines G1 to G20 were drawn at 12 μm intervals parallel to the thickness direction Z of the catalyst layer 40 and the undercoat layer 30 in each element mapping image. With respect to each of 40 grid lines, the distance between the intersection with the boundary line L1 and the intersection with the boundary line L2 was measured, and the average of the distance values was regarded as the “migration distance of a palladium element”. It can be said that the smaller the migration distance of the palladium element is, the better the migration of the palladium element is inhibited. The results are tabulated in Table 1.

Example 9

A composite oxide containing a magnesium (Mg) element and an aluminum (Al) element was made ready for use. An XRD performed using CuKα verified that the composite oxide made ready for use contained a spinel type crystal phase. The conditions for the XRD were the same described earlier.

The composite oxide made ready for use was calcined in the air atmosphere at 900° C. for 3 hours, and then pulverized with a ball mill to prepare a composite oxide powder having a median diameter $D_{50}$ of 7 to 10 μm and a BET specific surface area of 160 $m^2/g$. The median diameter $D_{50}$ of the composite oxide powder is a particle size at which the cumulative volume is 50% in a volume-based particle size distribution determined from the composite oxide powder using a laser diffraction scattering particle size distribution measurement method.

The composite oxide powder, a boehmite sol as a binder, and water were mixed to prepare a slurry for forming an undercoat layer. The amounts of the components of the slurry for forming an undercoat layer were adjusted in such a manner that the amounts of the aluminum element and the Group 2 element contained in the undercoat layer after calcining were the amounts mentioned in Table 1, respectively, based on the total molar amount of all the metal elements contained in the undercoat layer. The amounts of the aluminum element and the Group 2 element are amounts in terms of metal.

A catalyst was produced and evaluated in the same manner as in Example 1 except that the above-mentioned slurry for forming an undercoat layer was used as a slurry for forming an undercoat layer. The results are tabulated in Table 1.

Comparative Example 1

A catalyst was produced and evaluated in the same manner as in Example 1 except that no undercoat layer was formed. The results are tabulated in Table 1. In Comparative Example 1, a boundary line L3 (not depicted) between the partition wall 12 of the substrate 10 and the catalyst layer 40 was identified in place of the boundary line L2. With respect to each of 40 grid lines, the distance between the intersection with the boundary line L1 and the intersection with the boundary line L3 was measured, and the average of the distance values was regarded as the “migration distance of a palladium element”.

Comparative Example 2

A catalyst was produced and evaluated in the same manner as in Example 1 except that the undercoat layer was allowed to contain no Group 2 element. The results are tabulated in Table 1.

TABLE 1

| | Group 2 element | | Undercoat layer | | | | |
|---|---|---|---|---|---|---|---|
| | Species | Form of addition | Amount of aluminum element | Amount of Group 2 element | Mass per unit volume of substrate | Correlation coefficient | Migration distance of palladium element |
| Example 1 | Barium element | Barium acetate | 98 mol % | 2 mol % | 40 g/L | 54% | 10 μm |
| Example 2 | Barium element | Barium acetate | 98 mol % | 2 mol % | 20 g/L | 54% | 11 μm |
| Example 3 | Barium element | Barium acetate | 98 mol % | 2 mol % | 60 g/L | 54% | 9 μm |

TABLE 1-continued

| | Group 2 element | | Undercoat layer | | | | |
|---|---|---|---|---|---|---|---|
| | Species | Form of addition | Amount of aluminum element | Amount of Group 2 element | Mass per unit volume of substrate | Correlation coefficient | Migration distance of palladium element |
| Example 4 | Strontium element | Strontium acetate | 93 mol % | 7 mol % | 40 g/L | 75% | 10 μm |
| Example 5 | Magnesium element | Magnesium acetate | 94 mol % | 6 mol % | 40 g/L | 87% | 9 μm |
| Example 6 | Magnesium element | Magnesium acetate | 84 mol % | 16 mol % | 40 g/L | 87% | 10 μm |
| Example 7 | Magnesium element | Magnesium acetate | 68 mol % | 32 mol % | 40 g/L | 88% | 11 μm |
| Example 8 | Magnesium element | Magnesium oxide | 84 mol % | 16 mol % | 40 g/L | 39% | 11 μm |
| Example 9 | Magnesium element | Composite oxide containing Mg and Al* | 94 mol % | 6 mol % | 40 g/L | 91% | 2 μm |
| Comparative Example 1 | — | — | — | — | — | — | 40 μm |
| Comparative Example 2 | — | — | 100 mol % | — | 40 g/L | — | 15 μm |

*The composite oxide containing Mg and Al, used in Example 9, is a supply source of an aluminum element as well as a supply source of a Group 2 element.

The results tabulated in Table 1 have revealed that the presence of the undercoat layer between the substrate and the catalyst layer, in which the undercoat layer contains an aluminum element as a main component and a Group 2 element, makes it possible to inhibit the noble metal element contained in the catalyst layer from migrating to the substrate, and makes it possible to inhibit the deterioration of the exhaust gas purification performance.

REFERENCE SIGNS LIST

1 . . . Electrically heated exhaust gas purification catalyst
10 . . . Substrate
20*a*, 20*b* . . . Electrodes
30 . . . Undercoat layer
40 . . . Catalyst layer

The invention claimed is:

1. An electrically heated exhaust gas purification catalyst comprising:

a substrate;

at least one pair of electrodes provided on the substrate;

an undercoat layer provided on the substrate, the undercoat layer containing an aluminum element as a main component; and a catalyst layer provided on the undercoat layer, the catalyst layer containing a noble metal element, wherein the undercoat layer contains a Group 2 element, and wherein a total amount of the aluminum element and the Group 2 element contained in the undercoat layer is 95 mol % or more and 100 mol % or less based on a total molar amount of all metal elements contained in the undercoat layer.

2. The exhaust gas purification catalyst according to claim 1, wherein an amount of the aluminum element contained in the undercoat layer is 50 mol % or more based on the total molar amount of all metal elements contained in the undercoat layer.

3. The exhaust gas purification catalyst according to claim 1, wherein an amount of the Group 2 element contained in the undercoat layer is 1 mol % or more and 40 mol % or less based on the total molar amount of all metal elements contained in the undercoat layer.

4. The exhaust gas purification catalyst according to claim 1, wherein the aluminum element contained in the undercoat layer and the Group 2 element contained in the undercoat layer are in the form of a composite.

5. The exhaust gas purification catalyst according to claim 1, wherein the Group 2 element contained in the undercoat layer is selected from a magnesium element, a calcium element, a strontium element, and a barium element.

6. The exhaust gas purification catalyst according to claim 5, wherein the Group 2 element contained in the undercoat layer is a magnesium element.

7. The exhaust gas purification catalyst according to claim 1, wherein the substrate is an electroconductive ceramic substrate.

8. The exhaust gas purification catalyst according to claim 7, wherein the ceramic substrate contains a silicon-element-containing inorganic conductor as a main component.

9. The exhaust gas purification catalyst according to claim 1, wherein the noble metal element contained in the catalyst layer is a palladium element.

10. The exhaust gas purification catalyst according to claim 1, wherein locations of the Group 2 element and the aluminum element coincide at a correlation coefficient of 50% or more, and wherein the correlation coefficient is obtained by performing a line analysis of the undercoat layer with an electron probe microanalyser, and calculating the correlation coefficient in accordance with the following equation:

$$\text{Correlation coefficient} = \frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%)$$

wherein $x_i$ represents a characteristic X-ray intensity of the Group 2 element at location i, $x_{av}$ represents an average value of characteristic X-ray intensities of the Group 2 element, $y_i$ represents a characteristic X-ray intensity of the aluminum element at location i, and $y_{av}$ represents an average value of characteristic X-ray intensities of the aluminum element.

11. The exhaust gas purification catalyst according to claim 1, wherein a total amount of a cerium element and a zirconium element contained in the undercoat layer is 0 mol % or more and 5 mol % or less based on the total molar amount of all the metal elements contained in the undercoat layer.

12. The exhaust gas purification catalyst according to claim 1, wherein an amount of a noble metal element contained in the undercoat layer is 0 mol % or more and 3 mol % or less based on the total molar amount of all the metal elements contained in the undercoat layer.

* * * * *